United States Patent [19]

Kohno et al.

[11] Patent Number: 5,502,603
[45] Date of Patent: Mar. 26, 1996

[54] ROTATING HEAD TYPE RECORDING/REPRODUCING APPARATUS WHICH USES WIDE RECORDING HEADS TO RECORD A SINGLE PILOT SIGNAL OVER THREE TRACKS AND PREVENTING OVERWRITING OF THE PILOT SIGNAL BY THE NEXT HEAD SCAN

[75] Inventors: Takanobu Kohno, Tokyo; Tadashi Ozue, Kanagawa, both of Japan

[73] Assignee: Sony Corporation, Tokyo, Japan

[21] Appl. No.: 317,484

[22] Filed: Oct. 4, 1994

[30] Foreign Application Priority Data

Oct. 8, 1993 [JP] Japan .................................. 5-277842

[51] Int. Cl.$^6$ ......................................................... G11B 5/02
[52] U.S. Cl. ........................ 360/77.14; 360/64; 360/77.15
[58] Field of Search ............................ 360/77.12–77.13, 360/19.1, 27, 64

[56] References Cited

U.S. PATENT DOCUMENTS

| | | | |
|---|---|---|---|
| 4,388,657 | 6/1983 | Hedlund et al. | 360/64 X |
| 4,665,447 | 5/1987 | Odaka . | |
| 4,739,420 | 4/1988 | Odaka et al. | 360/77.14 |
| 4,785,360 | 11/1988 | Kozuki et al. | 360/77.14 X |
| 4,920,435 | 4/1990 | Yamazaki | 360/77.15 |
| 5,142,422 | 8/1992 | Zook et al. | 360/64 X |
| 5,243,474 | 9/1993 | Mitsuhashi | 360/77.13 X |
| 5,432,648 | 7/1995 | Watanabe et al. | 360/64 X |

FOREIGN PATENT DOCUMENTS

| | | |
|---|---|---|
| 63-133340 | 6/1988 | Japan . |
| 64-48255 | 2/1989 | Japan . |
| 4-32014 | 2/1992 | Japan . |

*Primary Examiner*—Aristotelis Psitos
*Assistant Examiner*—Larry T. Cullen
*Attorney, Agent, or Firm*—William S. Frommer; Alvin Sinderbrand

[57] ABSTRACT

A recording head Hw1 records a record signal including a data region, a pilot signal region, and a mask region with a width of 3 Tp. A recording head Hw2 overwrites the record region of the head Hw1 with another data. Since the recorded signal includes the mask region, the pilot signal region recorded by the head Hw1 is not erased. The recording head Hw1 overwrites with a record signal. At this point, since the recorded signal contains a mask region, the former pilot signal region is not erased. Instead, a new pilot signal region is formed. By repeating these operations, pilot signal regions are adjacently formed at track edges of a track corresponding to the recording head Hw1. Since the pilot signal is reproduced by a reproducing head with the same azimuth as the recording head, the pilot signal with a short wavelength can be used.

11 Claims, 9 Drawing Sheets

1. RECORDED BY REC HEAD Hw1    ←—HEAD TRACING DIRECTION

| DATA | MASK | PILOT | DATA | Tw |

2. OVERWRITTEN BY REC HEAD Hw2

3. OVERWRITTEN BY REC HEAD Hw1

4. OVERWRITTEN BY REC HEAD Hw2

1. RECORDED BY REC HEAD Hw1  ←—HEAD TRACING DIRECTION

2. OVERWRITTEN BY REC HEAD Hw2

3. OVERWRITTEN BY REC HEAD Hw1

4. OVERWRITTEN BY REC HEAD Hw2

ROTATING HEAD TYPE RECORDING/REPRODUCING APPARATUS WHICH USES WIDE RECORDING HEADS TO RECORD A SINGLE PILOT SIGNAL OVER THREE TRACKS AND PREVENTING OVERWRITING OF THE PILOT SIGNAL BY THE NEXT HEAD SCAN

BACKGROUND OF THE INVENTION

1. Field of the Invention

The present invention relates to a helically-scanned rotating-head type recording/reproducing apparatus for recording and reproducing code data, audio information, video information, and so forth onto and from a tape-shaped recording medium.

2. Description of the Prior Art

A rotating head type recording/reproducing apparatus that records and reproduces digital audio data or digital/analog video data onto and from a magnetic tape that is guided and travelled on a cylinder surface of a drum through rotating heads is known. When such data is recorded on the magnetic tape, slant tracks are successively formed thereon. When the recorded data is reproduced, the tracks should be precisely scanned by the heads. The technique for causing the heads to precisely trace the tracks is referred to as tracking control.

Various tracking control techniques have been proposed. In one technique, a control (CTL) signal is recorded in longitudinal direction of a magnetic tape at predetermined pitches so as to keep the phase of the reproduced CTL signal constant. In this method, magnetic heads dedicated for recording and reproducing the CTL signal are required. Similar problem will take place in a method that uses rotating heads for tracking control rather than fixed heads. In an 8-mm VCR, pilot signals with four frequencies are frequency multiplexed with recorded analog signal so that they are recorded on four successive tracks. The method that frequency multiplexes the pilot signals is not used for an apparatus that records and reproduces the base band of digital data because it is difficult to multiplex and separate frequencies of the pilot signals.

A method that is applicable for recording and reproducing digital data and that does not need to use heads dedicated for tracking control is employed for a digital audio tape recorder (DAT). In this method, an ATF (Automatic Track Finding) pilot signal is recorded in a predetermined region of a track. The tracking condition is determined corresponding to the relation of the signal levels of two pilot signals reproduced from two adjacent tracks (see U.S. Pat. No. 4,739,420). The DAT uses rotating heads with different azimuths (which represent angles against the extended directions of gaps of the heads) so as to decrease crosstalk that takes between adjacent tracks. Thus, to reproduce pilot signals from the adjacent tracks, low frequency (large wavelength) pilot signals, which have low azimuth loss, are used.

To reduce the size of the rotating heads or rotating transformers and simplify the construction thereof, an overwrite erasing system that does not use rotating erasing heads is preferably employed. However, since signals with long wavelength are recorded to a deeper portion of the magnetic tape, they are not easily erased by overwrite operation. In particular, these signals are not easily erased by signals with short wavelength such as digital data. Thus, to erase the pilot signal, a special erase signal with a wavelength longer than that of recorded data should be used. In the case of a magnetic tape where data was recorded, the data may not be completely erased. In addition, to detect the pilot signal, a position detecting signal is required. Thus, a pilot signal detecting circuit, a mis-detection preventing circuit, and the like are required.

OBJECT AND SUMMARY OF THE INVENTION

Therefore, an object of the present invention is to provide a rotating head type recording/reproducing apparatus that can solve the above-mentioned problem and that can use a signal with a short wavelength, which has high overwrite characteristics, without a position detecting signal.

A first aspect of the present invention is a rotating head type recording and reproducing apparatus for recording and reproducing an information signal that is a slant track onto and from a tape shaped recording medium, comprising a first recording rotating head with a width of three track pitches, a second recording rotating head with the same head width as the first recording rotating head and with a different azimuth from that of the first recording rotating head, a pilot signal generating means for generating a pilot signal with a predetermined frequency, a separating means for separating the information signal into a first information signal for the first recording rotating head and a second information signal recorded for the second recording rotating head, a record control means for causing the first recording rotating head and the second recording rotating head to overwrite a track that was recorded by the other recording rotating head for a predetermined amount with a new track so as to successively form tracks, for causing the first recording rotating head to form a pilot signal recording region, an information signal recording region, and a mask region corresponding to each scanning of the tape shaped recording medium, the pilot signal being recorded in the pilot signal recording region, the first information signal being recorded in the information signal recording region, and no signal being recorded in the mask region that corresponds to a pilot signal recording region recorded at the last scanning of the first recording rotating head, and for causing the second recording rotating head to form an information recording region and a mask region corresponding to each scanning of the tape shaped recording medium, the second information signal being recorded in the information signal recording region, the mask region corresponding to a pilot signal recording region recorded at the last scanning of the first recording rotating head, a first reproducing rotating head with a width that is equal to or larger than one track pitch and less than two track pitches and with the same azimuth as the first recording rotating head, a second reproducing rotating head with a width that is equal to or larger than one track pitch and less than two track pitches and with the same azimuth as the second recording rotating head, a tracking error signal generating means for generating a tracking error signal that varies corresponding to the relation of signal levels of two pilot signals reproduced from the two pilot signal regions on the same track by the fist reproducing rotating head, and a compensating means for compensating a tracking error corresponding to the tracking signal.

A second aspect of the present invention is a rotating head type recording apparatus for recording an information signal that is a slant track onto a tape shaped recording medium, comprising a first recording rotating head with a width of three track pitches, a second recording rotating head with the same head width as the first recording rotating head and with an azimuth angle different from that of the first recording rotating head, a pilot signal generating means for generating a pilot signal with a predetermined frequency, a separating means for separating the information signal into a first information signal for the first recording rotating head and a second information signal recorded for the second recording rotating head, and a record control means for causing the first recording rotating head and the second recording rotating head to overwrite a track that was recorded by the other recording rotating head for a predetermined amount with a new track so as to successively form tracks, for causing the first recording rotating head to form a pilot signal recording region, an information signal recording region, and a mask region corresponding to each scanning of the tape shaped recording medium, the pilot signal being recorded in the pilot signal recording region, the first information signal being recorded in the information signal recording region, and no signal being recorded in the mask region that corresponds to a pilot signal recording region recorded at the last scanning of the first recording rotating head, and for causing the second recording rotating head to form an information recording region and a mask region corresponding to each scanning of the tape shaped recording medium, the second information signal being recorded in the information signal recording region, the mask region corresponding to a pilot signal recording region recorded at the last scanning of the first recording rotating head.

A pilot signal with a width of 3 Tp is recorded on a magnetic tape by a first rotating head. When data is overwritten on the magnetic tape by a second rotating head with the same width as that of the first rotating head, a mask region is formed so as to prevent the former recorded pilot signal from being erased. When data is overwritten on the magnetic tape by the first rotating head, a pilot signal with the width of 3 Tp is recorded on the magnetic tape and another mask region is formed so as to prevent the former recorded pilot signal from being erased. Thus, on the magnetic tape, the two adjacent pilot signal regions are formed on the track formed by the first rotating head. A tracking error signal that represents the relation of the signal levels of reproduced outputs of these pilot signal regions is generated. Since the pilot signals are reproduced with the same azimuth angle, signals with short wavelength, which have high overwrite characteristics, can be used.

These and other objects, features and advantages of the present invention will become more apparent in light of the following detailed description of a best mode embodiment thereof, as illustrated in the accompanying drawings.

DESCRIPTION OF THE PREFERRED EMBODIMENTS

Figure 1:
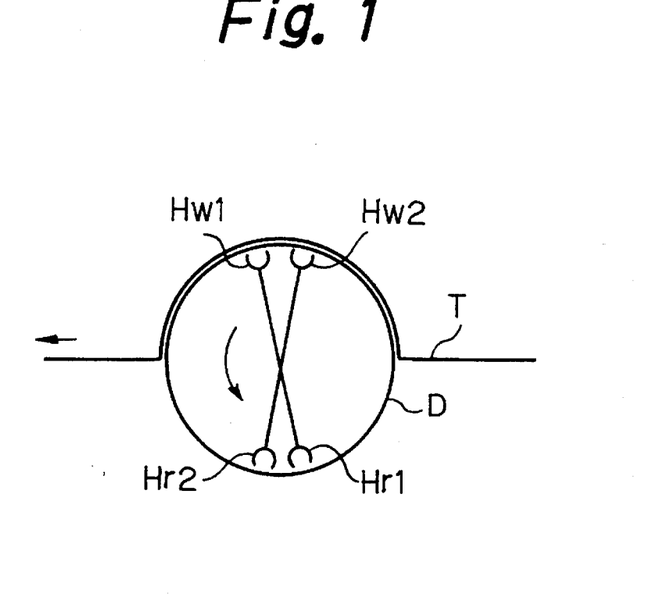
FIG. 1 is a schematic diagram showing an arrangement of heads according to an embodiment of the present invention.

Next, with reference to the accompanying drawings, an embodiment of the present invention will be described. FIG. 1 is a schematic diagram showing an arrangement of heads according to the present invention. For magnetic heads are disposed on a tape guiding drum that rotates at a predetermined rotating speed in arrow direction. A magnetic tape T is wound on the tape guiding drum D at a wrapping angle larger than around 180°. The magnetic tape T is fed by a capstan and a pinch roller (which are not shown) at a predetermined speed in arrow direction. Two recording heads Hw1 and Hw2 are adjacently disposed on the tape guiding drum D. Reproducing heads Hr1 and Hr2 are disposed on the tape guiding drum D. The recording heads Hw1 and Hw2 are opposed to the reproducing heads Hr1 and Hr2 at intervals of 180°, respectively.

The recording heads Hw1 and Hw2 are constructed as an integrated double-azimuth head where two gaps thereof are very closely formed. Likewise, the reproducing heads Hr1 and Hr2 are constructed as an integrated double-azimuth head. The recording heads Hw1 and Hw2 have a vertical gap equivalent to track pitch Tp each other. Likewise, the reproducing heads Hr1 and Hr2 have the similar gap each other. To reduce crosstalk that takes place between adjacent tracks, the azimuth of the recording head Hw1 differs from the azimuth of the recording head Hw2. The azimuth of the reproducing head Hr1 is the same as the azimuth of the recording head Hw1. The azimuth of the reproducing head Hr2 is the same as the azimuth of the recording head Hw2.

The head width Tw of the recording heads Hw1 and Hw2 is 3 Tp or more, preferably 4 Tp or less. For example, the head width of the recording heads is 3 Tp. The head width Tr of the reproducing heads Hr1 and Hr2 is in the range of $Tp \leq Tr \leq 2$ Tp. For example, Tr=1.5 Tp.

Figure 2:
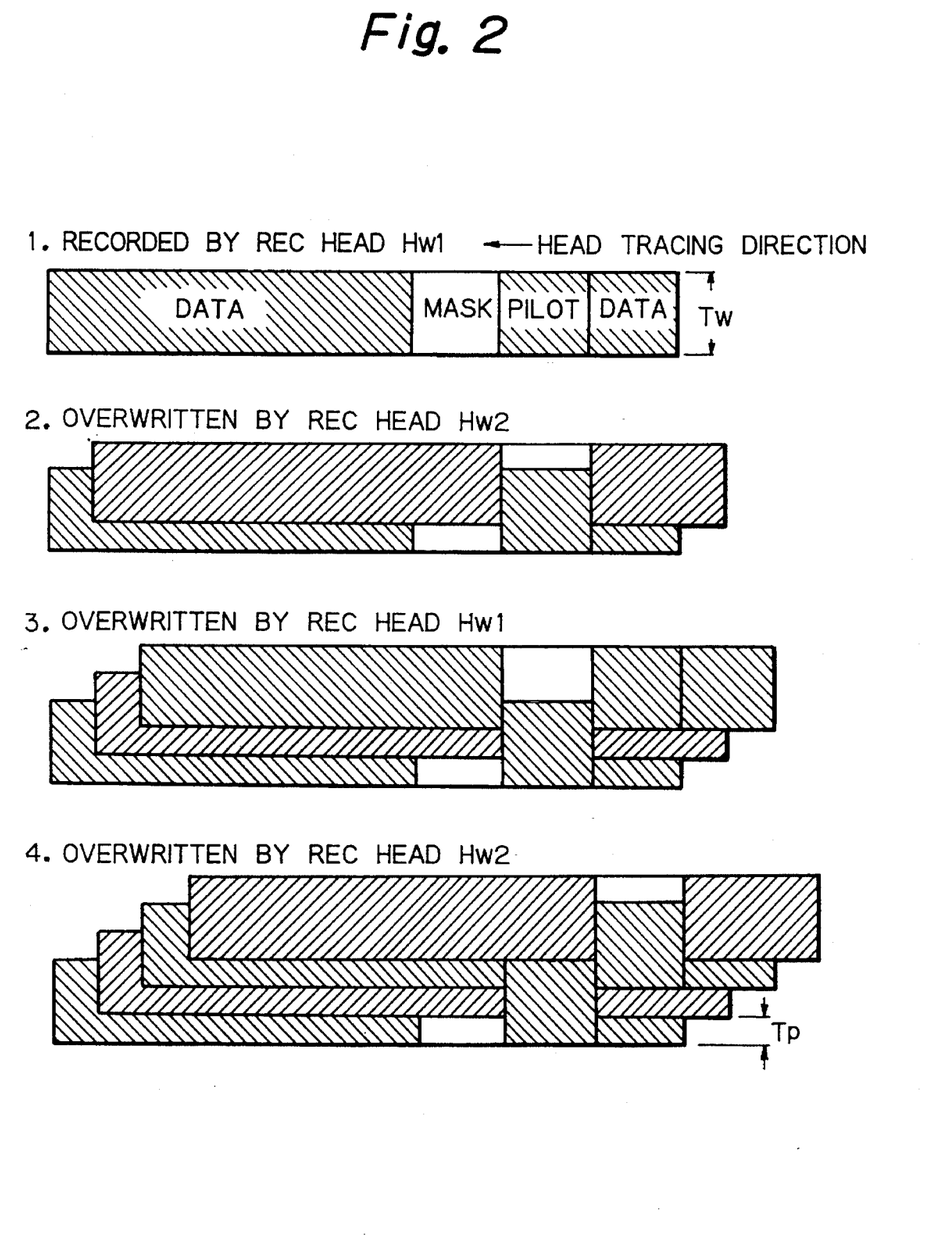
FIG. 2 is a schematic diagram for explaining recording operation according to the embodiment of the present invention.

Next, with reference to FIG. 2, the recording operation of a head tape system with the construction shown in FIG. 1 will be described. A digital record signal with a width of 3 Tp is recorded by the recording head Hw1. The digital recorded signal recorded on one track has for example a data region, a mask region, an ATF pilot signal region, and a data region. The mask region is used to prevent a record current from being supplied to a head. In the drawing, slant tracks are represented as horizontal tracks. Hatched lines of tracks represent azimuths of the recording heads.

The recording head Hw2 overwrites a track with an overlap of 2 Tp of a track that the recording head Hw1 records. Although the recording operations of the recording heads Hw1 and Hw2 are performed almost at the same time, in FIG. 2, for easy understanding, the recording operations of the heads Hw1 and Hw2 are separately represented. The recording head Hw2 records a mask region, which prevents a pilot signal recorded by the recording head Hw1 from being erased. The recording head Hw2 does not record an ATF pilot signal.

The recording head Hw1 scans the magnetic tape T and the recording head Hw2 overwrites data with an overlap of 2 Tp of a track that the recording head Hw2 records. In this case, the tracks formed by the recording heads Hw2 and Hw1 contain mask regions, the former pilot signal is not erased. By repeating the recording operations shown in FIG. 2, the record region of the pilot signal with the width of 3 Tp is formed at the predetermined position on the tape. Thus, two pilot signal regions are successively formed on the track.

Figure 3:
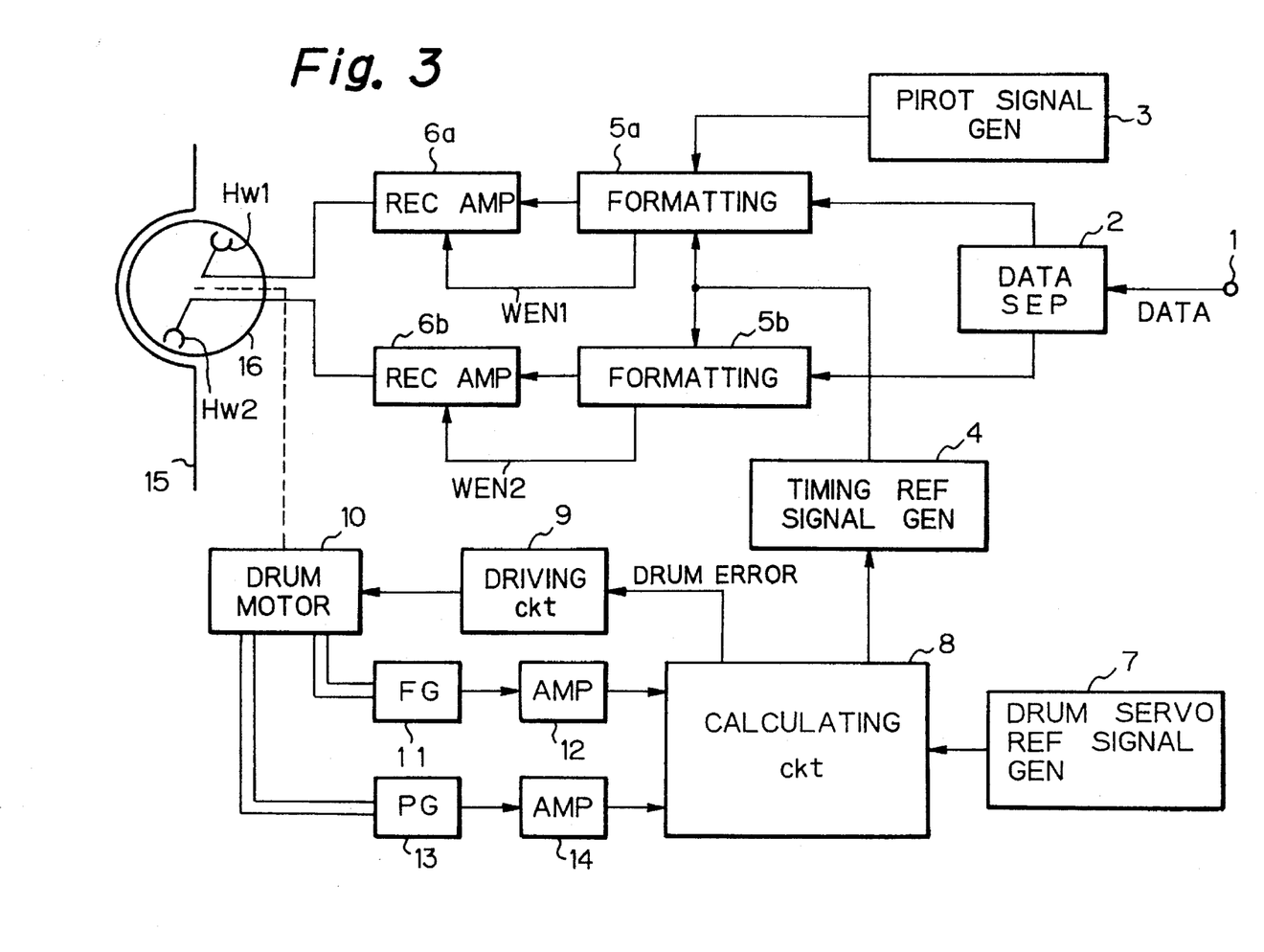
FIG. 3 is a block diagram showing a recording apparatus according to the embodiment of the present invention.

FIG. 3 is a schematic diagram showing the construction of a circuit for performing the above-described operations. In FIG. 3, reference numeral 1 is an input terminal. Data to be recorded is supplied to the input terminal 1. The data is supplied to a data separating circuit 2. The data separating circuit 2 separates the data into data for the recording head Hw1 and data for the recording head Hw2. Reference numeral 3 is a pilot signal generating circuit. The pilot signal generating circuit 3 generates an ATF pilot signal with a predetermined frequency. The frequency of the pilot signal is constant. Thus, unlike with a conventional 8-mm VCR, it is not necessary to generate pilot signals with four different frequencies. However, it should be appreciated that pilot signals with four different frequencies may be generated. The frequency of the pilot signal will be selected so that excellent overwrite characteristics are obtained. For example, when the highest frequency of the data to be recorded is 26 MHz, ¼ or less of the frequency thereof, namely 6.5 MHz, will be selected. This frequency is satisfactorily higher than the frequency of the ATF pilot signal of the above-mentioned digital audio tape recorder.

Reference numeral 5a is a formatting circuit that receives a timing reference signal from a timing signal generating circuit 4, the data for the recording head Hw1 from the data separating circuit 2, and the pilot signal from the pilot signal generating circuit 3 and outputs the data for the recording head Hw1. Likewise, a formatting circuit 5b outputs the data for the recording head Hw2. As described above, since the recording head Hw2 does not record the pilot signal, it is not supplied to the formatting circuit 5b. The formatting circuits 5a and 5b generate the data for the recording heads Hw1 and Hw2 in a predetermined track format (as shown in FIG. 2) and write enable signals WEN1 and WEN2, respectively, in accordance with a timing reference signal.

These data for the recording heads Hw1 and Hw2 are supplied to the recording heads Hw1 and Hw2 through recording amplifiers 6a and 6b and rotating transformers (not shown), respectively. The write enable signals WEN1 and WEN2 are supplied from the formatting circuits 5a and 5b to the recording amplifiers 6a and 6b, respectively.

A drum 16 on which a magnetic tape 15 is wound is rotated by a drum motor 10. Reference numeral 11 is a frequency generator. Reference numeral 13 is a pulse generator. The frequency generator 11 and the pulse generator 13 generate a frequency signal and a pulse signal, respectively. The frequency signal and the pulse signal are supplied to a calculating circuit 8 through amplifiers 12 and 14, respectively. The calculating circuit 8 generates a drum error signal by a known method corresponding to the frequency signal, the pulse signal, and a drum servo reference signal (that is supplied from a drum servo reference signal generator 7). The drum error signal is supplied to a drum motor driving circuit 9. The drum motor driving circuit 9 drives the drum motor 10. The calculating circuit 8 supplies a switching signal that has a predetermined phase difference from the drum servo reference signal. The timing reference signal generating circuit 4 generates a timing signal corresponding to the switching signal. The timing signal is supplied to the formatting circuits 5a and 5b. Thus, the drum 16 is rotated in synchronization with the supply of the data to the rotating head 16.

Figure 4:
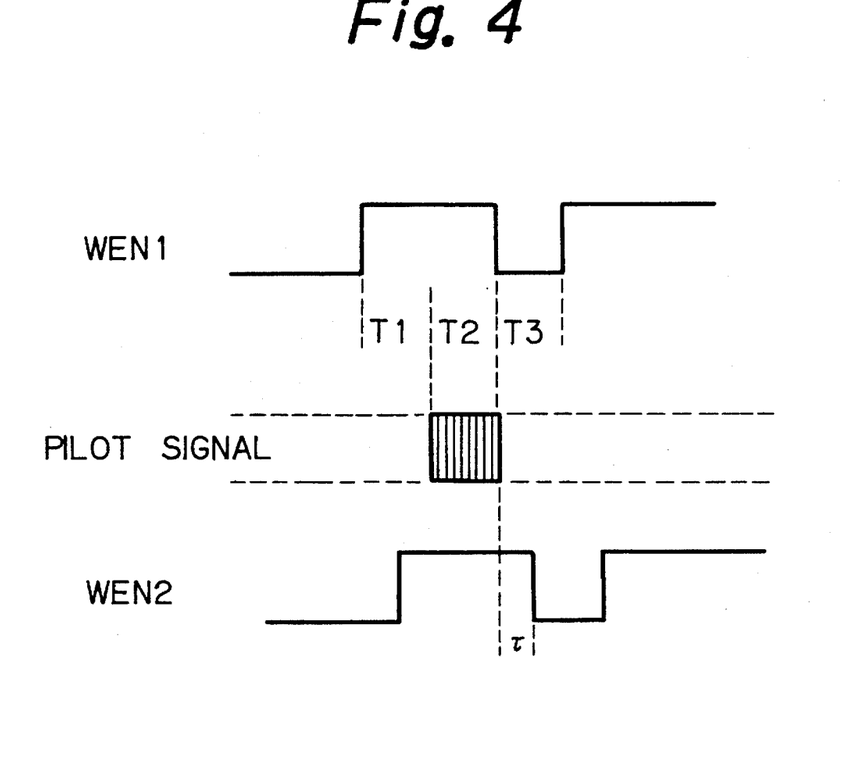
FIG. 4 is a timing chart for explaining the recording operation according to the embodiment of the present invention.

FIG. 4 is a schematic diagram showing the recording operation. The signal level of the write enable signal WEN1 is high at periods T1 and T2 and low at period T3. When the signal levels of the write enable signals WEN1 and WEN2 are high, the respective recording operations are enabled. When the signal levels of the write enable signals WEN1 and WEN2 are low, the respective recording operations are disabled. Referring to FIG. 2, the data region corresponds to the period T1, the pilot signal region to the period T2, and the mask region to the period T3. The pilot signal is a sine wave or a pulse wave with the above-mentioned frequency. Only the hatched portion of the pilot signal is recorded in the pilot signal region of the magnetic tape. Although the waveform of the write enable signal WEN2 is the same as the waveform of the write enable signal WEN1, the former has a delay time τ against the latter. The delay time τ is equivalent to the gap length between the recording heads Hw1 and Hw2.

Next, reproducing operations of the reproducing heads Hr1 and Hr2 that reproduce the above-mentioned record pattern from the magnetic tape will be described. Since the tracking control pilot signal is recorded by the recording head Hw1, the tracking control is performed with a reproduced output signal of the reproducing head Hr1, which has the same azimuth as that of the recording head Hw1.

Figure 5:
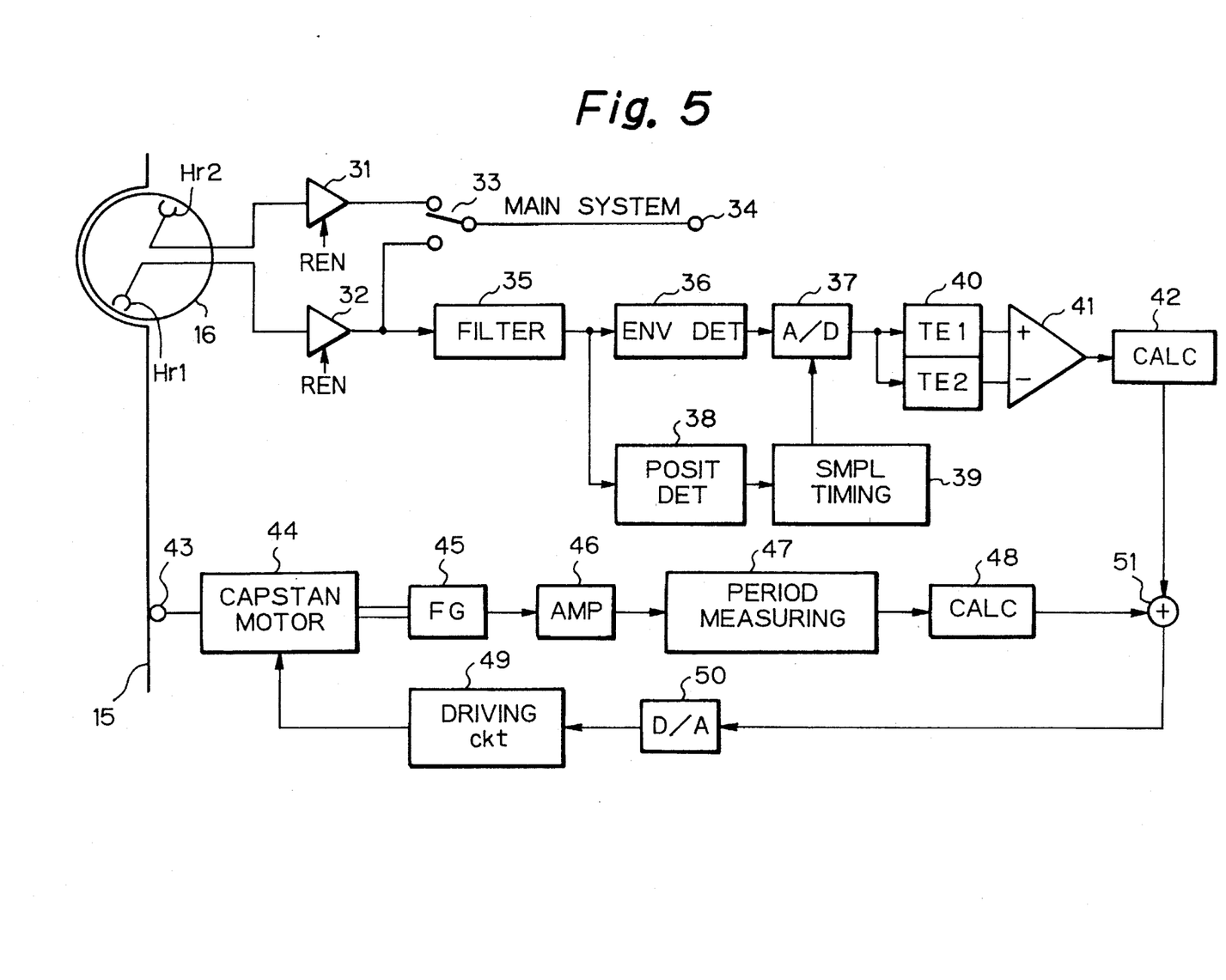
FIG. 5 is a block diagram showing a reproducing apparatus according to the embodiment of the present invention.

FIG. 5 is a schematic diagram showing the construction of a circuit for processing a reproduced signal according to the present invention. For simplicity, in FIG. 5, the construction of a main system that processes reproduced digital data (code data, audio data, video data, and so forth) is omitted.

Reproduced signals of reproducing heads Hr1 and Hr2 disposed on a drum 16 are supplied to a switching circuit 33 through reproducing amplifiers 31 and 32, respectively. A read enable signal REN is supplied to a reproducing amplifier 11. When the signal level of the read enable signal is high (namely, in reproducing mode), the reproducing amplifiers 31 and 32 are active. The switching circuit 33 outputs reproduced signals of the reproducing amplifiers 31 and 32 to the main system (not shown) of the reproduced digital data through a terminal 34.

In addition, the reproduced signal of the reproducing head Hr1 is supplied to a filter 35 through the reproducing amplifier 32. The filter 35 has a pass band whose center frequency is the frequency of the pilot signal. The filter 35 outputs a reproduced pilot signal.

The reproduced pilot signal is supplied to an envelop detecting circuit 36 and a position detecting signal generating circuit 38. A detected output of the envelop detecting circuit 36 is supplied to an A/D converter 37. An output signal of the position detecting signal generating circuit 38 is supplied to a sampling timing generating circuit 39. The sampling timing generating circuit 39 generates a sampling pulse that is supplied to an A/D converter 38. The A/D converter 38 samples the detected signal of the envelop detecting circuit 36 and outputs digital detected data TE1 and TE2. The detected data TE1 and TE2 are stored in a memory (or register) 40.

The detected data TE1 and TE2 are supplied to a subtractor 41. An output signal of the subtractor 41, which is TE1−TE2, is supplied to a calculating circuit 42. The calculating circuit 42 generates a tracking error signal corresponding to the output signal of the subtractor 41 and supplies the tracking error signal to an adder 19.

Reference numeral 43 is a capstan that is in contact with the magnetic tape 15. The capstan 43 is driven by a capstan motor 44. Reference numeral 45 is a frequency generator that generates a frequency signal corresponding to the rotating speed of the capstan motor 44 and supplies the frequency signal to an amplifier 46. The amplifier 46 amplifies the frequency signal and supplies the amplified frequency signal to a period measuring circuit 47. The period measuring circuit 47 outputs a digital frequency signal. The digital frequency signal is supplied to a calculating circuit 48 that generates a speed error signal. The speed error signal and the tracking error signal are supplied to an adder 51. The adder 51 adds the speed error signal and the tracking error signal and outputs a capstan error signal to a digital analog converter 50. The digital analog converter 50 converts the digital capstan error signal into an analog capstan error signal. The analog capstan error signal is supplied to a capstan driving circuit 49.

The rotating speed of the capstan motor 44 is controlled corresponding to an output signal of the capstan driving circuit 49.

In the above-described embodiment, the tracking is controlled by controlling the rotating speed of the capstan motor (namely, the tape traveling speed). However, a means for varying the height of the heads may be provided and the trace positions of the heads may be moved so as to control the tracking.

Figure 6:
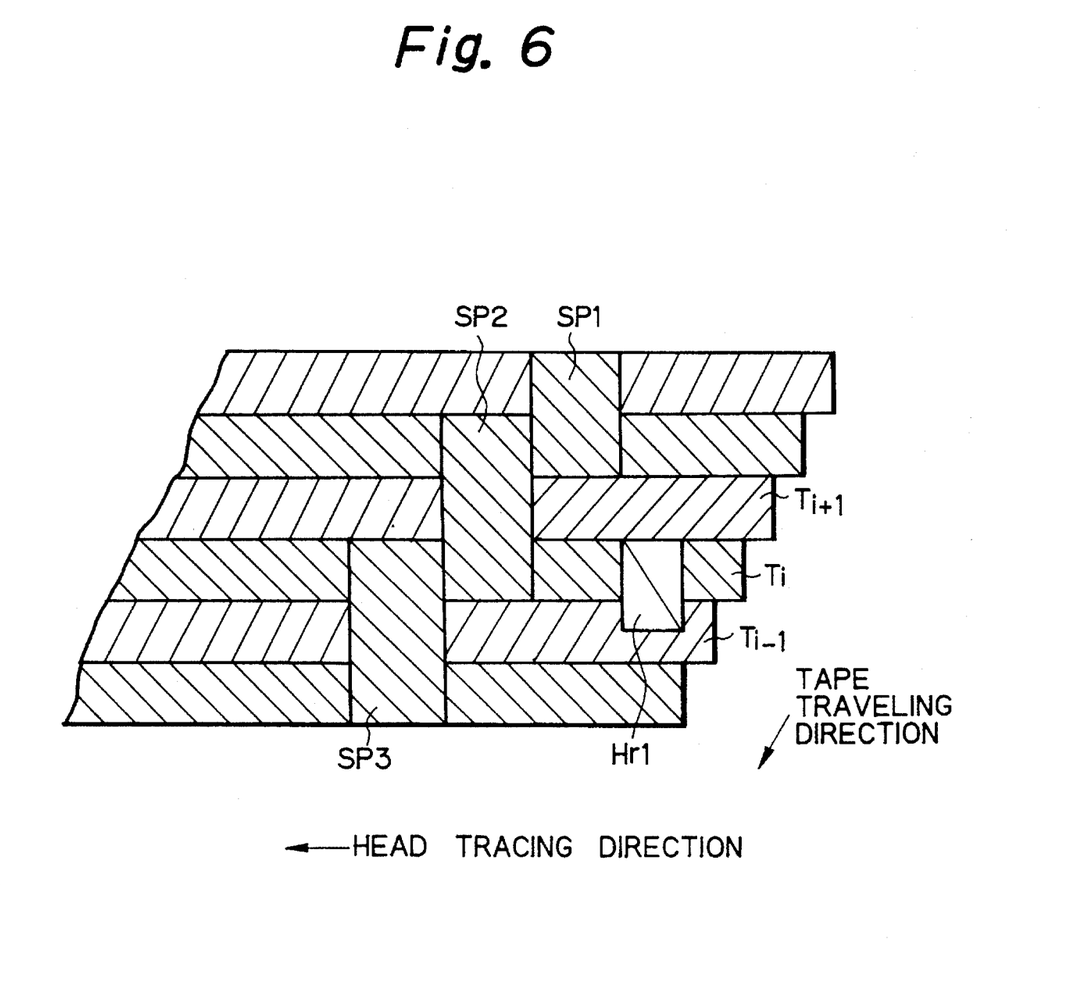
FIG. 6 is a schematic diagram for explaining the generation of a tracking error signal according to the embodiment of the present invention.
Figure 7:
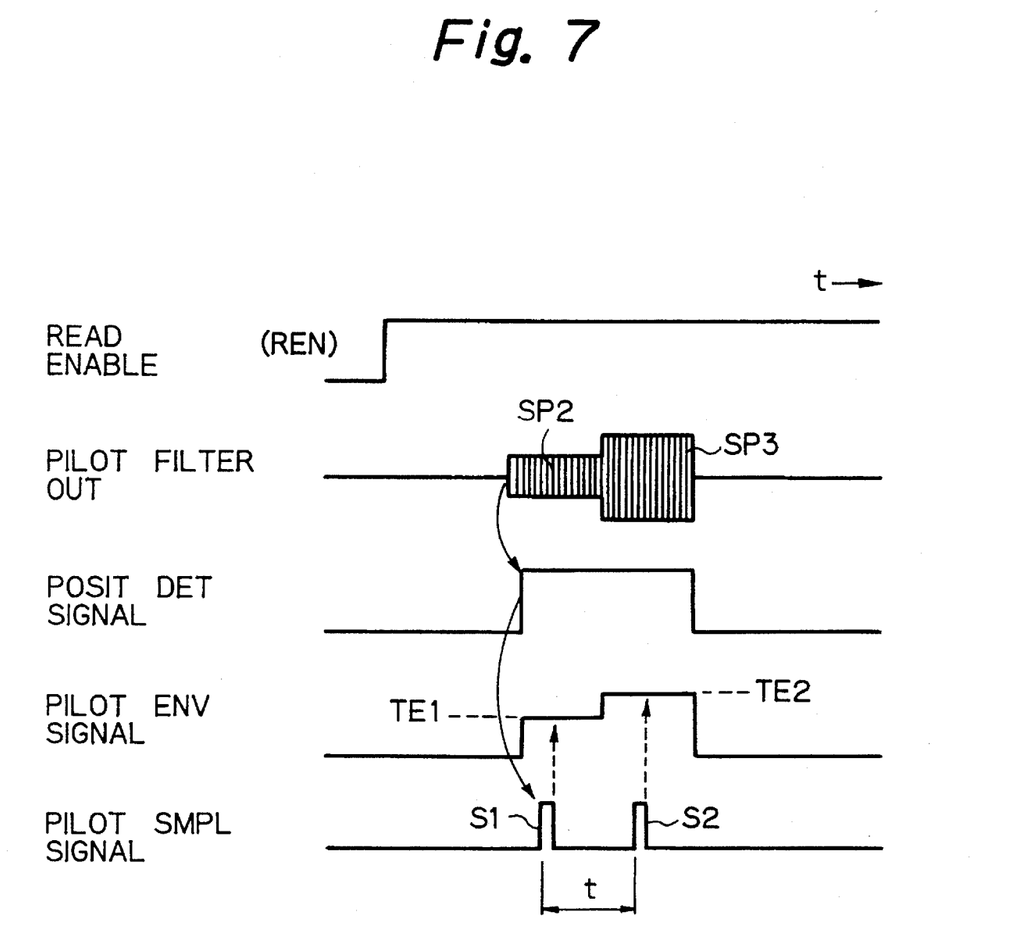
FIG. 7 is a timing chart for explaining the generation of the tracking error signal according to the embodiment of the present invention.

FIG. 6 is an enlarged view showing the reproducing head Hr1 that traces tracks on the magnetic tape. The reproducing head Hr1 traces three successive tracks $T_{i-1}$, $T_i$, and $T_{i+1}$ as shown in FIG. 6. As described above, pilot signals SP1, SP2, SP3, ... are recorded corresponding to the width of the three tracks. First, the reproducing head Hr1 reproduces the pilot signal SP2. Next, the reproducing head Hr1 reproduces the pilot signal SP3. Thus, as shown in FIG. 7, while the reproducing operation is being performed, where the signal level of the read enable REN signal is high, the filter 12 outputs the reproduced pilot signals SP2 and SP3.

As shown in FIG. 6, the signal level of the reproduced pilot signal SP3 is larger than the signal level of the reproduced pilot signal SP2 at a track position more deviated toward the track $T_{i-1}$ than the center of the track $T_i$. As shown in FIG. 7, this relation applies to the detected output of the envelop detecting circuit 36. The position detecting signal generating circuit 38 generates the position detecting signal that is in high level while the filter 35 is generating the reproduced pilot signal.

The position detecting signal is supplied to the sampling timing generating circuit 39 that generates sampling pulses S1 and S2 with predetermined phases corresponding to the high level of the position detecting signal. The time difference t between the sampling pulses S1 and S2 corresponds to pitches of record positions of adjacent pilot signals. The sampling pulses S1 and S2 are supplied to the A/D converter 37 that samples the pilot envelop signal received from the envelop detecting circuit 36 and converts the pilot envelop signal into a digital signal. In FIG. 7, an output signal of the A/D converter 37 is represented by TE1 and TE2 where TE1<TE2.

The calculating circuit 42 outputs a tracking error signal corresponding to TE1−TE2. The polarity and value of the tracking error signal represent the direction and amount of the tracking error. In FIG. 6, if the reproducing head Hr1 traces the center of the track $T_i$, TE1=TE2. On the other hand, when the reproducing head Hr1 is deviated toward the track $T_{i+1}$, TE1>TE2. In such a manner, the tracking error signal which represents the direction and amount of a tracking error is formed. The tracking error signal is added to the speed error signal. With the capstan error signal, the capstan motor is controlled. Thus, the tracking error can be decreased.

On the other hand, since the azimuth of the reproducing head Hr2 differs from the azimuth of the reproducing head Hr1, the former cannot reproduce the pilot signal. However, the tracking control can be satisfactorily performed by only the reproducing head Hr1. The construction for forming the tracking error signal shown in FIG. 5 is just an example. In other words, digital data received from the A/D converter 37 may be processed by a microcomputer.

Figure 8:
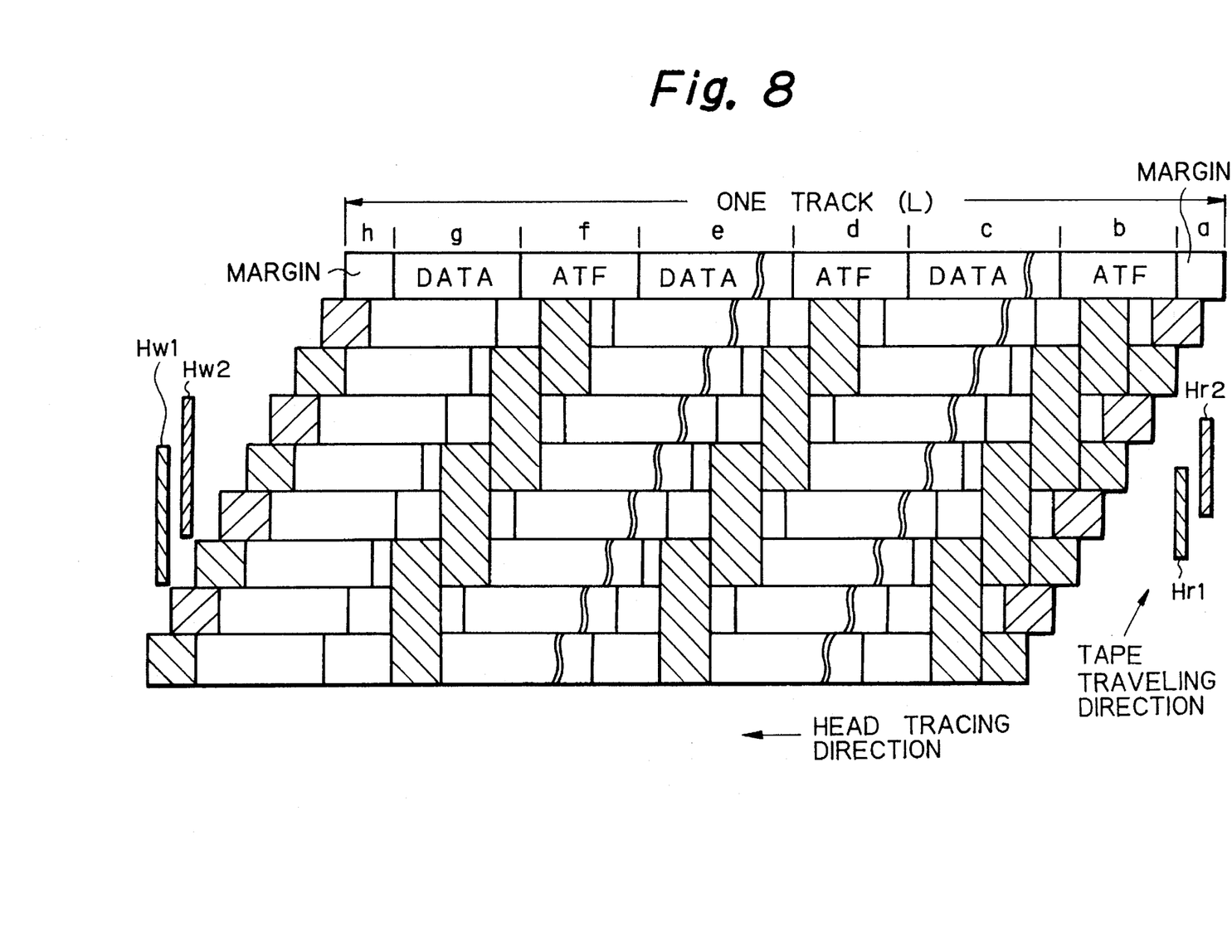
FIG. 8 is a schematic diagram showing a track pattern formed according to the present invention.

FIG. 8 is a schematic diagram showing a more practical example of a record pattern according to the present invention. One track has a length of L. The track is traced in the order of a margin region with a length of a, an ATF region with a length of b, a data region with a length of c, an ATF region with a length of d, a data region with a length of e, an ATF region with a length of f, a data region with a length of g, and a margin region with a length of h. In FIG. 8, the margin regions and the ATF regions are represented with two types of hatched lines that represent azimuths of heads.

Audio data, video data, and/or sub data that are digitally modulated are recorded in the data regions. The ATF regions are formed nearly at both the edge positions and the center position of each track so as to improve the accuracy of the tracking control. In FIG. 8, the head widths of the recording heads Hw1 and Hw2 and the reproduction heads Hr1 and Hr2 are shown.

Figure 9:
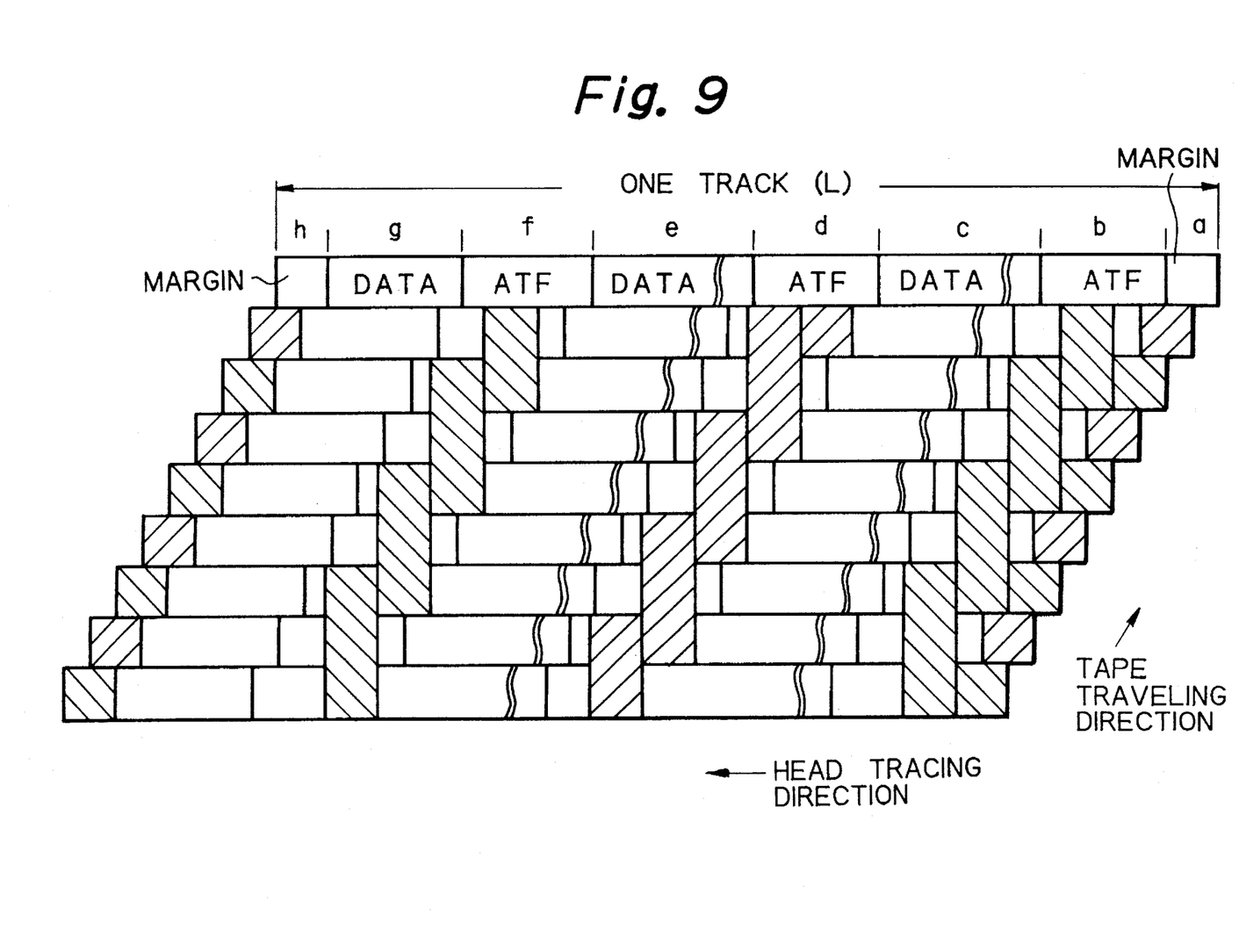
FIG. 9 is a schematic diagram showing another track pattern formed according to the present invention.

FIG. 9 is a schematic diagram showing another record pattern according to the present invention. The format of a plurality of regions formed on each track shown in FIG. 9 is the same as that shown in FIG. 8. In FIG. 9, pilot signals are recorded at ATF regions nearly at the center position and both edge positions of each track by different heads with the different azimuths. For example, the recording head Hw1 records a pilot signal at ATF regions of nearly edge positions of a track, whereas the recording head Hw2 records a pilot signal at an ATF region of nearly the center position of a track. Thus, in FIG. 9, the record positions of both the pilot signals deviate for one track pitch.

The record pattern shown in FIG. 9 is formed of the pilot signals recorded by the recording heads and reproduced signals reproduced by the corresponding reproducing heads with the same azimuth as that of the corresponding recording heads. For example, by averaging tracking error signals formed of the output signals of the two reproducing heads, a final tracking error signal is preferably formed.

Figure 10A:
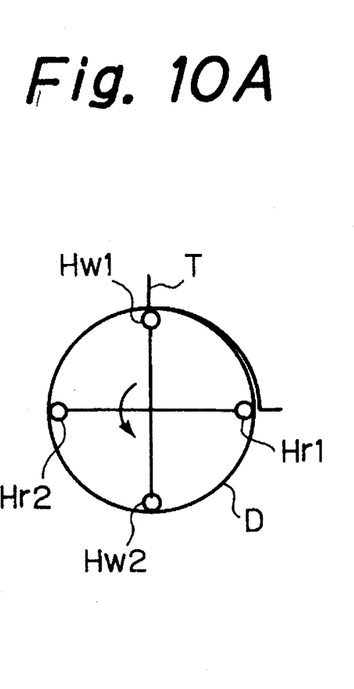
FIGS. 10A to 10C are schematic diagrams showing several head arrangements according to the present invention.
Figure 10B:
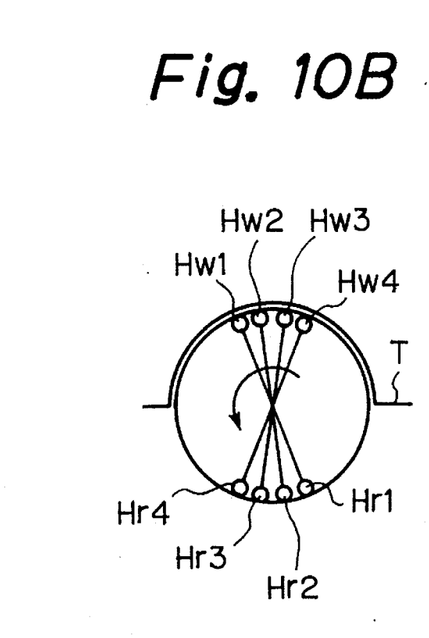
Figure 10C:
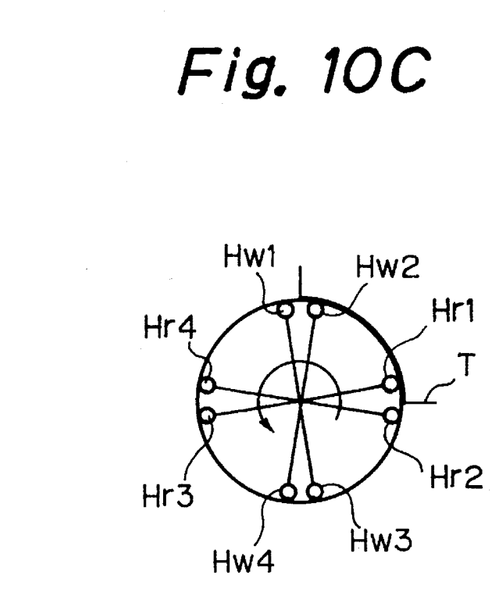

FIGS. 10A to 10C are schematic diagrams showing other arrangements of heads according to the present invention. FIG. 10A shows an arrangement of heads where the recording heads Hw1 and Hw2 and the reproducing heads Hr1 and Hr2 are disposed on a drum D at intervals of 90°. In this arrangement, the azimuth of the recording head Hw1 is the same as the azimuth of the reproducing head Hr1, whereas the azimuth of the recording head Hw2 is the same as the azimuth of the reproducing head Hr2. The magnetic tape T is wound on the drum D with a wrapping angle of 90° (or 180°). In the head arrangement shown in FIG. 10A, the recording heads Hw1 and Hw2 alternately trace the magnetic tape T.

According to the present invention, the number of rotating heads is not limited to four. Instead, as shown in FIG. 10B, the present invention can be applied to a head arrangement where four recording heads Hw1, Hw2, Hw3, and Hw4 and four reproducing heads Hr1, Hr2, Hr3, and Hr4 are adjacently disposed and the recording heads Hw1, Hw2, Hw3 and Hw4 are opposed to the reproducing heads Hr1, Hr2, Hr3, and Hr4, respectively, at intervals of 180°. In FIG. 10B, the recording heads Hw1 and Hw3 and the reproducing heads Hr1 and Hr3 have a first azimuth. The recording heads Hw2 and Hw4 and the reproducing heads Hr2 and Hr4 have a second azimuth.

In FIG. 10C, eight rotating heads are provided. A first recording head pair Hw1 and Hw2, a first reproducing head pair Hr3 and Hr4, a second recording head pair Hr4 and Hr3, and a second recording head pair Hw4 and Hw3 are disposed on the drum D in the order at intervals of 90°.

According to the present invention, pilot as those of recording heads so as to control the tracking. Thus, pilot signals with short wavelengths can be used. Consequently, overwrite characteristics can be improved. A pilot erasing signal is not required. Data can be prevented from being imperfectly erased. Since the pilot signals are recorded with a width of three tracks, a reproduced signal can be used as a position detecting signal. Thus, it is not necessary to record the position detecting signal and to provide a position detecting signal processing circuit. In the above-mentioned embodiment, the recording system and the reproducing system were separately described. However, the present invention is not limited to such systems. Instead, the present invention can be applied to a recording and reproducing apparatus where the recording system and the reproducing system are integrated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A rotating head type recording and reproducing apparatus for recording and reproducing an information signal as a slant track onto and from a tape shaped recording medium, comprising:

(1) a first recording rotating head with a width equal to or wider than three track pitches;

(2) a second recording rotating head with the same head width as said first recording rotating head and with a different azimuth from that of said first recording rotating head;

(3) pilot signal generating means for generating a pilot signal with a predetermined frequency;

(4) separating means for separating the information signal into a first information signal for said first recording rotating head and a second information signal for said second recording rotating head;

(5) record control means (a) for causing said first recording rotating head and said second recording rotating head to overwrite a track that was recorded by the other recording rotating head for a predetermined width with a new track so as to successively form tracks, (b) for causing said first recording rotating head to form a pilot signal recording region, an information signal recording region, and a mask region during each scan to the tape shaped recording medium, the pilot signal being recorded in the pilot signal recording region, the first information signal being recorded in the information signal recording region, and no signal being recorded in the mask region that corresponds to a pilot signal recording region recorded at the last scanning of said first recording rotating head, and (c) for causing said second recording rotating head to form an information recording region and a mask region during each scan to said tape shaped recording medium, the second information signal being recorded in the information signal recording region, the mask region corresponding to a pilot signal recording region recorded at the last scanning of said first recording rotating head;

(6) a first reproducing rotating head with a width that is equal to or larger than one track pitch and equal to or less than two track pitches and with the same azimuth as said first recording rotating head;

(7) a second reproducing rotating head with a width that is equal to or larger than one track pitch and equal to or less than two track pitches and with the same azimuth as said second recording rotating head;

(8) tracking error signal generating means for generating a tracking error signal that varies according to the relation of signal levels of two pilot signals reproduced from the two pilot signal regions on the same track by said fist reproducing rotating head; and (9) compensating means for compensating a tracking error in accordance with the tracking signal.

2. The rotating head type recording and reproducing apparatus as set forth in claim 1, wherein the two pilot signal regions on the same tracks are successively formed.

3. The rotating head type recording and reproducing apparatus as set forth in claim 1, wherein the pilot signal has one frequency.

4. The rotating head type recording and reproducing apparatus as set forth in claim 1, wherein said first recording rotating head and said second recording rotating head are adjacently disposed.

5. The rotating head type recording and reproducing apparatus as set forth in claim 4, wherein said first reproducing rotating head and said second reproducing rotating head are opposed to said first recording rotating head and said second recording rotating head at intervals of 180°, respectively.

6. The rotating head type recording and reproducing apparatus as set forth in claim 1, wherein the width of said first recording rotating head is equal to three track pitches, and wherein said control means is adapted to cause said first recording rotating head and said second recording rotating head to overwrite $\frac{2}{3}$ of the last track recorded by the other recording rotating head with a new track so as to successively form tracks.

7. A rotating head type recording apparatus for recording an information signal as a slant track onto a tape shaped recording medium, comprising:

(1) a first recording rotating head with a width equal to or wider than three track pitches;

(2) a second recording rotating head with the same head width as said first recording rotating head and with a different azimuth from that of said first recording rotating head;

(3) pilot signal generating means for generating a pilot signal with a predetermined frequency;

(4) separating means for separating the information signal into a first information signal for said first recording rotating head and a second information signal for said second recording rotating head; and (5) record control means (a) for causing said first recording rotating head and said second recording rotating head to overwrite a track that was recorded by the other recording rotating head for a predetermined width with a new track so as to successively form tracks, (b) for causing said first recording rotating head to form a pilot signal recording region, an information signal recording region, and a mask region during each scan to the tape shaped recording medium, the pilot signal being recorded in the pilot signal recording region, the first information signal being recorded in the information signal recording region, and no signal being recorded in the mask region that corresponds to a pilot signal recording region recorded at the last scanning of said first recording rotating head, and (c) for causing said second recording rotating head to form an information recording region and a mask region during each scan to said tape shaped recording medium, the second information signal being recorded in the information signal recording region, the mask region corresponding to a pilot signal recording region recorded at the last scanning of said first recording rotating head.

8. The rotating head type recording apparatus as set forth in claim 7, wherein the two pilot signal regions on the same tracks are successively formed.

9. The rotating head type recording apparatus as set forth in claim 7, wherein the pilot signal has one frequency.

10. The rotating head type recording apparatus as set forth in claim 7, wherein said first recording rotating head and said second recording rotating head are adjacently disposed.

11. The rotating head type recording apparatus as set forth in claim 7, wherein the width of said first recording rotating head is equal to three track pitches, and wherein said control means is adapted to cause said first recording rotating head and said second recording rotating head to overwrite ⅔ of the last track recorded by the other recording rotating head with a new track so as to successively form tracks.

* * * * *